United States Patent

Xu et al.

[11] Patent Number: 5,689,374
[45] Date of Patent: Nov. 18, 1997

[54] GRIN LENS AND METHOD OF MANUFACTURING

[75] Inventors: Xiaojie Xu; Michael E. Savard, both of Tucson, Ariz.

[73] Assignee: LightPath Technologies, Inc., Albuquerque, N. Mex.

[21] Appl. No.: 400,804

[22] Filed: Mar. 8, 1995

[51] Int. Cl.$^6$ ............................................. G02B 3/00
[52] U.S. Cl. ........................... 359/652; 359/654; 359/710
[58] Field of Search ........................... 359/652, 653, 359/654, 710

[56] References Cited

U.S. PATENT DOCUMENTS

| | | | |
|---|---|---|---|
| 3,823,995 | 7/1974 | Carpenter | 359/654 |
| 4,770,506 | 9/1988 | Baba | 359/654 |
| 4,772,105 | 9/1988 | Takada | 359/654 |
| 4,844,589 | 7/1989 | Asahara et al. | 350/413 |
| 4,929,065 | 5/1990 | Hagerty et al. | 359/653 |
| 5,044,737 | 9/1991 | Blankenbecler | 359/653 |
| 5,166,827 | 11/1992 | Noda | 359/652 |
| 5,184,251 | 2/1993 | Tsuchida et al. | 359/654 |
| 5,262,896 | 11/1993 | Blankenbecler | 359/653 |
| 5,268,791 | 12/1993 | Tsuchida | 359/654 |

*Primary Examiner*—Georgia Y. Epps
*Assistant Examiner*—Dawn-Marie Bey
*Attorney, Agent, or Firm*—Benman, Collins & Sawyer

[57] ABSTRACT

An optical element having an optical axis, and comprising a plurality of definable adjacent zones of optical material, each zone having a definable refractive index different from the refractive index of an adjacent zone and an Abbe number, the zones of optical materials being arranged parallel to each other to define a profile of refractive indices which is symmetric about a plane of symmetry along the optical axis of the element and parallel to the zones. In one embodiment the optical element is a spectrally invariant lens.

9 Claims, 8 Drawing Sheets

GRIN LENS AND METHOD OF MANUFACTURING

TECHNICAL FIELD

This invention relates generally to devices for directing light, and more particularly to cylindrical optical lens element having desired dispersion properties.

BACKGROUND OF THE INVENTION

1. Cylindrical lenses

Traditionally a cylindrical lens element is, as its name suggests, constituted by a cylinder of optical material such as glass. This type of lens is typically used in applications requiring magnification of an image in one dimension only. An example of this is transforming a point image into a line image or, put more generally, changing the height of an image without changing its width or vice versa. Typical industrial applications of a cylindrical lens include slit and line detector array illumination.

Although cylindrical lenses have a number of useful applications, they are more difficult and costly to manufacture than lenses with spherical surfaces. This is because the fine-grinding and polishing machines typically used in the manufacture of lenses are designed to work the surface of the lens randomly. This random working helps to ensure a smooth and geometrically correct surface and, at the same time, reduces the likelihood of scratches and other surface imperfections. Unfortunately though, a random wear function between two bounded surfaces generates a spherical and not a cylindrical surface and the typical lens grinding and polishing machines are, therefore, unsuitable for the manufacture of cylindrical lenses. Accordingly, specially designed machines are needed to generate and polish the cylindrical surfaces required for this type of lens and, as a result, the cost of cylindrical lenses is much greater than that associated with comparably sized spherical lenses.

In addition to the difficulties associated with their manufacture, traditionally formed cylindrical lenses, as with other lenses, can also cause chromatic and/or monochromatic aberrations in the images they form. Chromatic aberration, as discussed below, results from the fact that an optical material has a different refractive index for different wavelengths (colors) of light. Monochromatic aberrations, on the other hand, are caused by the physical configuration of the lens and can be classified into five categories, namely spherical aberration, coma, astigmatism, curvature of field and distortion.

2. GRIN Optical Materials

Over the past several years, optical materials with a gradient of refractive index, also known as GRIN materials, have been used in a variety of different applications in optics. Some GRIN lenses exhibit a change in refractive index along their optical axis, and are known as axially gradient GRIN lenses. Other types of GRIN lenses exhibit a change in refractive index along their radial axes orthogonal to the optical axis and are known as radially gradient GRIN lenses. More complex GRIN lenses, which have changes in refractive index in all three dimensions, are also known.

An example of a lens which has a chosen gradient in its index of refraction both orthogonal to and longitudinally along an optical axis is disclosed in U.S. Pat. No. 4,883,522 to Hagerty. Other examples of GRIN lenses can also be found in U.S. Pat. No. 4,928,065, also to Hagerty, which teaches a large change in the index of refraction over a significant dimension along its optical axis.

One advantage of using GRIN lenses is that they can be used in designing compound lens systems with a single, integral lens or a reduced number of lenses. Another advantage of GRIN lenses is their ability to reduce monochromatic aberrations. Generally, of the five different kinds of monochromatic aberrations (spherical aberration, coma, astigmatism, curvature of the field and distortion) a GRIN lens can substantially reduce spherical aberration, and to some extent also reduce the remaining four, particularly when compared with homogeneous lens systems.

However, GRIN lenses, just as homogeneous lenses, still exhibit chromatic aberration (caused by dispersion).

3. Chromatic Aberration

For all optical materials, whether homogeneous or GRIN, the refractive index (the amount light is bent by an optical material with respect to impinging light) varies based on the wavelength (or, conversely, the frequency) of the light. If the angle of incidence remains constant, different wavelengths of light, impinging on an optical material with the same angle of incidence, are bent differently.

For a homogeneous optical material, the refractive index for an impinging light with a short wavelength is always higher (i.e., bends more) than that for a light with a longer wavelength. Thus, in a lens formed from a homogeneous optical material, blue light has shorter focal length than red light. This wavelength (or frequency) dependence of the refractive index is the cause for chromatic aberration in optical lenses.

Figure 1:
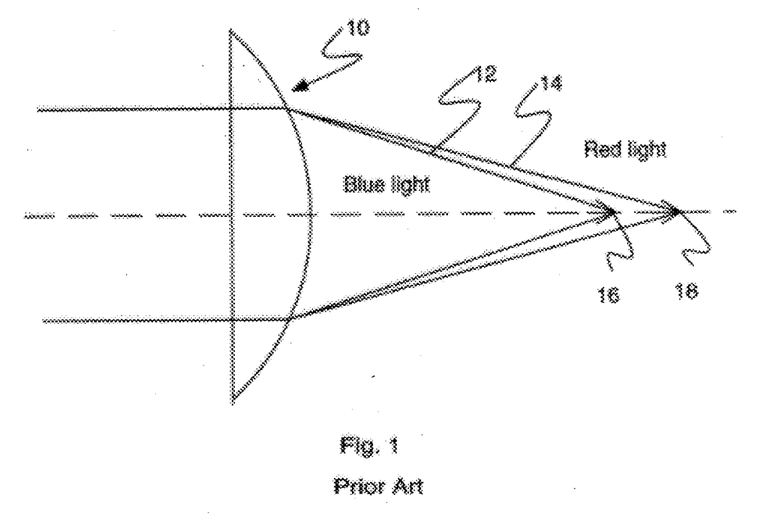
FIG. 1 illustrates a prior art spherical homogeneous lens.

Graphically, this is illustrated in FIG. 1, which shows a prior art lens 10 formed of homogeneous optical material. In order to focus light at a desired focal point, lens 10 has a curved surface as shown. However, as illustrated in FIG. 1, the focal length of the lens is shorter for impinging blue light 12 than for red light 14. Thus the blue light is focussed at a focal point 16 while the red light is focused at a more distant focal point 18. As a result, the image formed by lens 10 experiences chromatic aberrations or dispersion.

More specifically, the dispersion of an optical material can generally be defined as a function of the difference in refractive index between a long-wavelength and a short-wavelength light impinging on the optical material. For a homogeneous material the dispersion is described by its Abbe number which is defined as:

$$v_d = \frac{n_d - 1}{n_F - n_C} \quad (1)$$

where $n_d$, $n_F$ and $n_C$ are the refractive indices of the optical material for yellow light, blue light and red light, having wavelengths, 587.6, 486.1, and 656.3 nm, respectively. The Abbe number and dispersion of an optical material are inversely related. Therefore, a lower dispersion means a higher Abbe number.

For most oxide homogeneous optical glass the Abbe number $v_d$ is in the range of 20 to 75. In order to obtain a higher Abbe number, exotic materials have been developed, such as fluoride glasses, which are undesirable because of high cost, toxicity, poor mechanical strength, poor resistance to staining, etc. In an homogeneous optical system, a number of lenses made of different glasses must be used to correct the chromatic aberration. The Fraunhofer doublet is an example of such an attempt.

The Fraunhofer doublet is a lens system formed of a crown double convex lens in contact with a concave-planar flint lens. The theoretical frequency invariant condition for this doublet is defined as:

$$f_1 d v_{1d} + f_2 d v_{2d} = 0 \quad (2)$$

where $f_{1d}$, $v_{1d}$, $f_{2d}$ and $v_{2d}$ are the focal length and Abbe number for the crown double convex lens and the concave-planar flint lens, respectively. Because the glasses used for the lens are homogeneous, the Abbe number remains a constant across the lens and Equation 2 holds true across the entire lens.

Unfortunately, the Fraunhofer lens system, cannot eliminate chromatic aberration completely and it often requires additional lenses, at a cost of a more complex system, to cancel out the dispersion. The Fraunhofer lens system also exhibits monochromatic aberrations inherent in homogeneous glass systems.

4. Dispersion in GRIN lenses

Even in GRIN lenses (which have many advantages over homogeneous lens systems), a desired dispersion characteristic is extremely difficult to produce. This is due, in part, to the complex dispersion properties of GRIN lenses. Through this specification, the terms "GRIN" and "gradient" have been used interchangeably.

For example, an axially gradient lens, has a variable refractive index along its optical axis. I.e., the index and Abbe number vary axially along the optical axis. As a result, it is extremely difficult to achieve desired dispersion properties with GRIN lenses.

Hence there is a need for an improved method of manufacture of a cylindrical lens as well as a method of manufacture of an optical GRIN lens in which the variables can be controlled to achieve a desired dispersion characteristic.

OBJECTS AND SUMMARY OF THE INVENTION

Objects

It is therefore an object of this invention to provide a gradient lens which can be used as a cylindrical lens.

Another object of this invention is to provide for a method of manufacturing a cylindrical gradient lens.

Yet another object of this invention is to control dispersion characteristics of a cylindrical or other type of gradient lens.

Still a further object of this invention is to minimize chromatic aberration and provide a lens which is, or is close to, spectrally invariant.

Additional objects, advantages and features of the invention are set forth in the following summary and detailed description.

Summary

Accordingly, this invention provides a gradient optical element formed of optical material and having front and back faces and an optical axis, and having a refractive index that varies symmetrically about a central plane containing said optical axis, said refractive index being substantially constant in directions parallel to said central plane.

Preferably the optical material in the outer zones of the element orthogonally most distant from the central plane have the same refractive index, being either the highest or the lowest of the refractive indices of the element, and the central portion of the element containing the central plane has a refractive index different from the refractive index of the material of the outer zones and being, respectively, either the lowest or the highest of the refractive indices of the element.

In a preferred embodiment, the refractive index of the optical material varies continuously between the central portion and the outer zones.

Typically, in order for the optical element to perform as a cylindrical lens, it should have at least one planar face generally orthogonal to the plane of symmetry. It is, however, possible to form the optical element with a spherical or otherwise curved surface to obtain various optical characteristics.

This invention also provides for a method for manufacturing a cylindrical lens and other optical devices having a gradient of refractive index. The method comprises the steps of selecting a plurality of optical materials each having a refractive index and Abbe number and fusing together the plurality of the optical materials in successive layers to form a body of optical material.

Preferably the selected optical materials are arranged in parallel layers in descending or ascending order of their respective indices, so that the body of optical material includes a first face of material having the highest index and an opposite face of material having the lowest index of the plurality of selected optical materials.

In order to form the cylindrical lens of this invention, two elements of material, each including material from the first and second face, are removed from this body of optical material. These elements are then joined together under heat, with faces of material of like index abutting, to form a body of material from which a cylindrical lens can be manufactured.

To provide for a better joint between the two elements, the faces to be joined together can be formed to be convex.

According to an alternative embodiment of the invention, if the starting optical materials are in the form of sheets of optical material of appropriate thickness and composition, a cylindrical lens blank may be formed in a single operation by stacking all of the layers together in the appropriate order (i.e. with the sheet having the highest or lowest refractive index in the middle and the sheets having respectively the lowest or highest refractive index on the outside) and fusing the stack together.

According to another aspect of this invention, the optical materials can be selected in order to achieve a desired dispersion characteristic for a lens formed using the method of the invention.

A lens formed from a desired number of layers q, and a desired Abbe number $V_{grin}=K$ can be obtained by selecting materials and other process parameters such that for each two adjacent layers in the lens:

$$\frac{\Delta n \, v_{dm} \, v_{d(m-1)}}{v_{dm}(n_{d(m-1)}-1) - v_{d(m-1)}(n_{dm}-1)} = K \quad (3)$$

where $\Delta n$ is the difference of refractive index of materials in layers m and m−1 for yellow light, m is an integer between 2 and q; $v_{dm}$ and $n_{dm}$ are respectively the Abbe number and refractive index for yellow light of layer m; $v_{dm-1}$ and $n_{dm-1}$ are the Abbe number and refractive index for yellow light of layer m−1; and layer 1 and layer q are at opposite ends of the stack with, respectively, the lowest and highest refractive index $n_{dl}$ and $n_{dh}$.

The Abbe number $V_{grin}$, of the lens, can be any desired positive or negative number and can approach infinity (i.e. zero dispersion) if the denominator of this equation approaches zero, i.e., if for each two adjacent layers in the lens:

$$v_{dm}(n_{d(m-1)}-1) = v_{d(m-1)}(n_{dm}-1). \quad (4)$$

It can be shown that, if Equation 4 is met for each pair of adjacent layers in the lens, it also applies for non-adjacent layers.

Therefore, for the spectrally invariant case, the two layers with highest and lowest refractive index and dispersion (positioned at the opposite ends of the radius) have the following relationship:

$$v_{dl}(n_{dh}-1) = v_{dh}(n_{dl}-1). \quad (5)$$

where $v_{dl}$ and $v_{dh}$ are the lowest and highest Abbe number in the group of optical materials constituting the GRIN lens. When relationship (4) exists for each pair of layers of the lens, the resultant GRIN lens becomes spectrally invariant with little or no chromatic aberration. In practical application, it is normally difficult or impossible to satisfy the relationship of Equation 4 exactly, and for purposes of this discussion, a cylindrical GRIN lens having an Abbe number of at least 100 is considered to be substantially spectrally invariant. Once a GRIN lens is subjected to the diffusion process described below, the materials of the individual layers diffuse into one another, so that the refractive index profile and the Abbe number of the optical materials varies continuously rather than in a stepwise fashion.

For a cylindrical GRIN lens having a parabolic or hyperbolic profile of refractive index and optical layers with highest and lowest Abbe numbers respectively closest and farthest away from the plane of symmetry, a lens with desired dispersion characteristics can be manufactured by selecting the optical materials of the layers in accordance with Equation 3 and using a appropriate diffusion regime to obtain a parabolic or hyperbolic profile of refractive index. A substantially spectrally invariant cylindrical GRIN lens can be designed by selecting optical materials according to Equations 4 and 5.

Furthermore, other gradient optical elements, which are made of a plurality of optical layers stacked together and which exhibit a linear or other arbitrary desired profile of refractive index can be manufactured to be substantially spectrally invariant by selecting optical materials of the layers in accordance with Equation 4.

The layers of optical materials may be selected from known optical materials with desired refractive indices and dispersions, or alternatively, the optical materials used to form a cylindrical gradient lens or other optical elements may be specifically formulated to have particular desired refractive index and dispersion properties. Specifically, when the optical material is glass, the refractive index and dispersion of each glass may be controlled by the concentration of one or a combination of oxides from a group including but not limited to PbO, BaO, $Y_2O_3$, $La_2O_3$, $Nb_2O_5$, $TiO_2$, $ZrO_2$, $WO_3$ and $Ta_2O_3$.

Further details of the present invention will become readily apparent to those skilled in the art from the following detailed description, wherein the preferred embodiments have been shown and described. As will be realized, the invention is capable of other and different embodiments, and its several details are capable of modifications all without departing from the invention. Accordingly, the drawing and description are to be regarded as illustrative in nature, and not as restrictive.

BRIEF DESCRIPTION OF THE DRAWINGS

FIGS. 9(a) to (c) illustrates the effect of grinding a spherical surface into a block of GRIN material manufactured according to this invention.

FIGS. 10(a) and (b) are schematic illustrations of a conventional laser diode culminating lens system.

DETAILED DESCRIPTION

Figure 2:
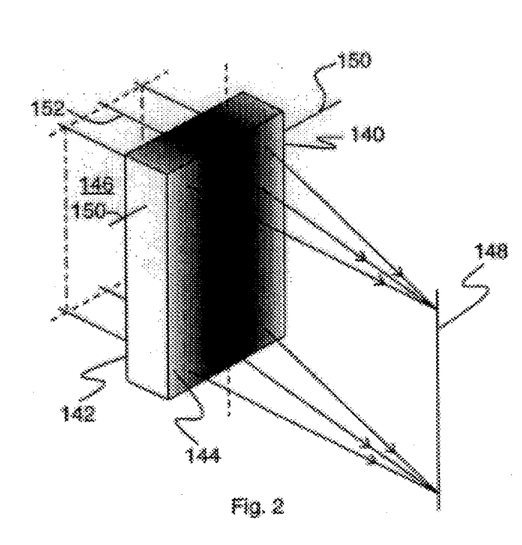
FIG. 2 illustrates an embodiment of the cylindrical GRIN lens according to the invention.
Figure 3A:
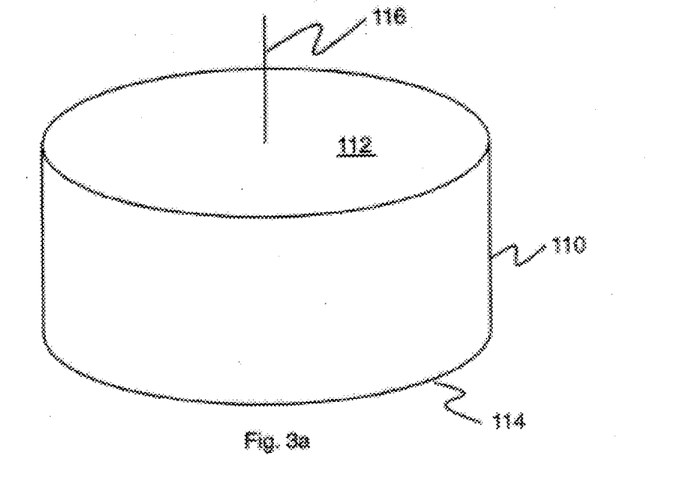
FIGS. 3(a) and (b) illustrate a blank of GRIN optical material produced during the first step of manufacturing a cylindrical GRIN lens.

Referring now to FIG. 2 of the drawings, the cylindrical gradient lens 140 has a gradient of refractive index only along one axis 150 orthogonal to the optical axis 152 of the lens. The lens 140 has flat front and back surfaces, 142 and 144, and can act as a cylindrical lens to focus light from a two-dimensional image 146 into a line 148. A method of manufacturing the cylindrical GRIN lens 140 is described with reference to FIGS. 3 through 5. The first step, as shown in FIG. 3(a), is to produce a blank 110 of optical material having gradient of refractive index along its central axis 116. Blank 110 may be made by stacking a plurality of layers of optical material of selected thicknesses and refractive indices in a descending or ascending order of their respective refractive indices and fusing them together to form a body having a desired refractive index profile. This method is disclosed in U.S. Pat. No. 4,929,065 (Hagerty) the disclosure of which is incorporated herein by reference. Alternatively, blank 110 can be manufactured by depositing successive layers of glass frit in a mold in order of decreasing refractive index, and then forming the layers in the mold by a fusion process.

This process is described in co-pending U.S. Ser. No. 08/163,861 (Xu) which is incorporated herein by reference. Briefly, the method disclosed in this application operates as follows. As a first step, a desired profile, types of glass (or other optical material) to be used and thicknesses of the layers of material making up the element must be determined. Thereafter a mold of appropriate plan area is selected. As the layer thickness for each layer of glass and the plan area of the mold are known, the volume of each of the different materials required to yield the desired profile can be calculated. The different glass types can then individually be crushed into a frit and the calculated volumes of each optical material be placed in successive layers in the mold in order of decreasing density. In doing so, glasses with the greater densities are placed closer to the bottom of the mold than glasses with lesser densities.

The mold is then heated above the melting temperature of all the glasses to cause them to fuse into an integral contiguous body of optical material having the desired gradient profile.

Figure 3B:
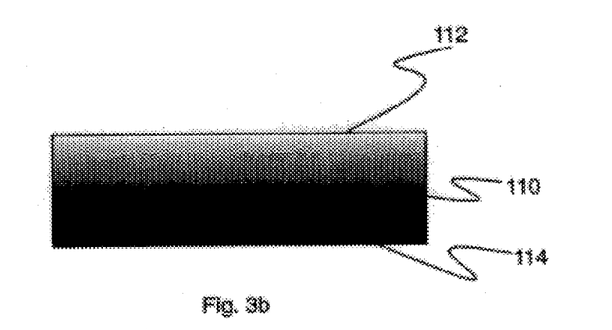
Figure 3C:
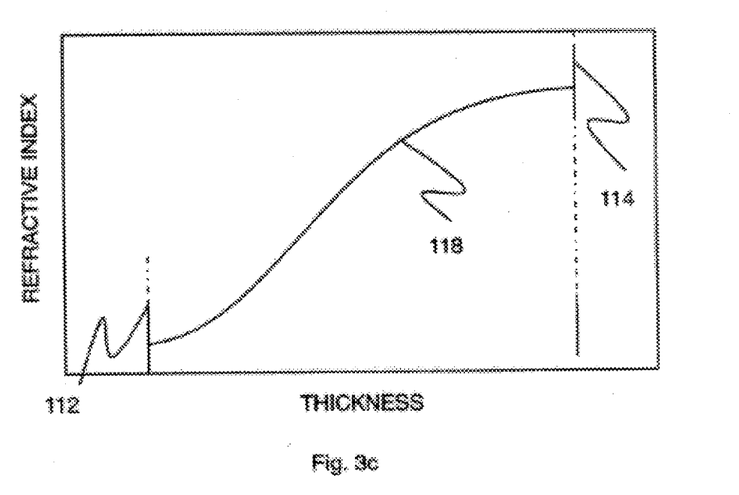
FIG. 3(c) is a graphical representation of the gradient index of the blank GRIN material of FIG. 3(a).

FIG. 3(b) is a schematic illustration of the change in the refractive index along the axis 116 (across the cross section). GRIN blank 110 has a low index face 112 and a high index face 114. Face 112 of blank 110 is formed of a material having the lowest refractive index in the stack, while the opposite face 114 is formed of material having the highest refractive index. Preferably, between the two faces, blank 110 has layers with refractive indices which form a half-parabolic profile as illustrated by curve 118 in FIG. 3(c).

The next step is to carefully orient, grind and polish the low and high index faces, 112 and 114 respectively, of the GRIN blank 110. The optical properties, such as gradient index profile, are also normally measured during this step.

After this, the blank 110 of GRIN material is cut, normal to the isoindex planes, into two pieces, each having the same dimensions. To produce the cylindrical GRIN lens the two pieces are joined together with either their high index faces 114 or low index faces 112 abutting. Before the surfaces are joined, however, they are preferably polished to be slightly convex. It has been found that, for a surface about 4 cm$^2$, a curvature showing 10 rings on an optical flat with green light is acceptable for this process. After the surfaces have been polished, they may be cleaned in an ultrasonic bath of methanol for ten minutes, rinsed with distilled water to remove mineral deposits, and thereafter, held together and heated to cause them to fuse together.

As an example, a block of axial GRIN material having a parabolic profile of refractive index with a range from 1.96 to 1.76 (with a glass transition temperature. (Tg) for this range of Tg=395° C. to Tg=410° C. respectively) at opposite faces was prepared. After polishing and cleaning, as described above, the surfaces of index 1.96 were placed in contact, kept horizontal and the two pieces heated at 10° C./minute to a temperature which is 30° to 50° C. above the glass transition temperature (Tg), but not above the softening temperature of the glass. In this case, the two pieces were heated to 400° C. and held at that temperature for 60 minutes, after which they were heated at 1° C./minute to 440° C. and held at that temperature for 60 minutes and then cooled at 5° C./minute to room temperature. Material was then removed from the edges and the sample was finished. When the refractive index values for the two abutting faces are very close and the surfaces are very clean, no interface between the two pieces is visible after joining by this process.

This process has the advantages that it eliminates the interface between the two pieces of optical material; gives superior thermal and chemical resistance properties since no low temperature, low durability wax or glue is used to join the surfaces; provides a boundary which is as impervious to water and corrosive materials as the original glass; and improves transmission of light across the joined surfaces, since no reflection takes place at the interface.

Alternatively, the two pieces of GRIN material can be glued together using optical cement having a refractive index matching the refractive index of the faces being joined.

Figure 4A:
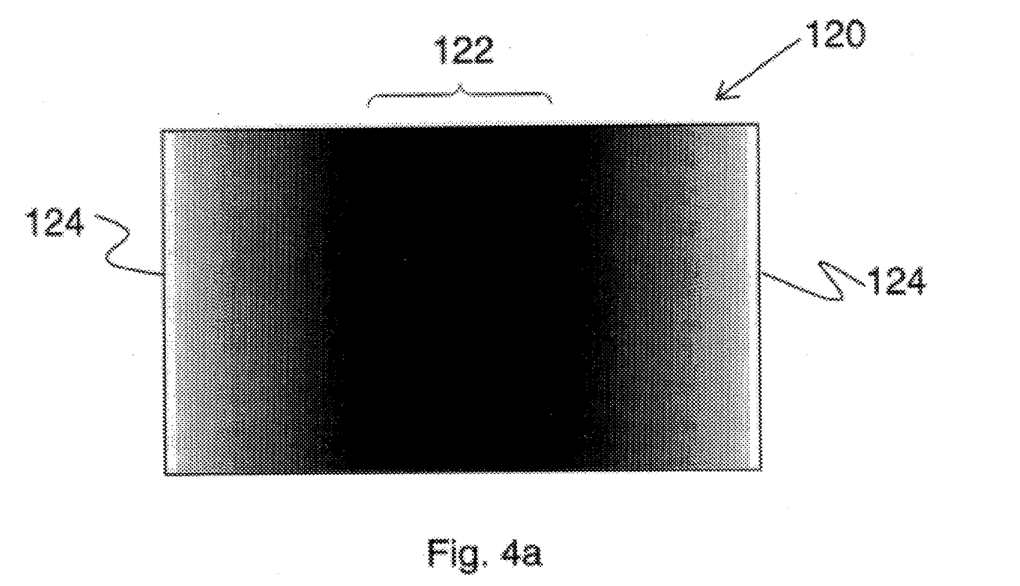
FIG. 4(a) represents one embodiment of a cylindrical GRIN lens.

If the high index faces 114 are joined, the resulting block 120 of optical material is as schematically represented in FIG. 4(a). The block 120 has a central zone 122 of material having a high refractive index. From this central zone 122 the index decreases towards the ends 124 of the block 120.

Figure 4B:
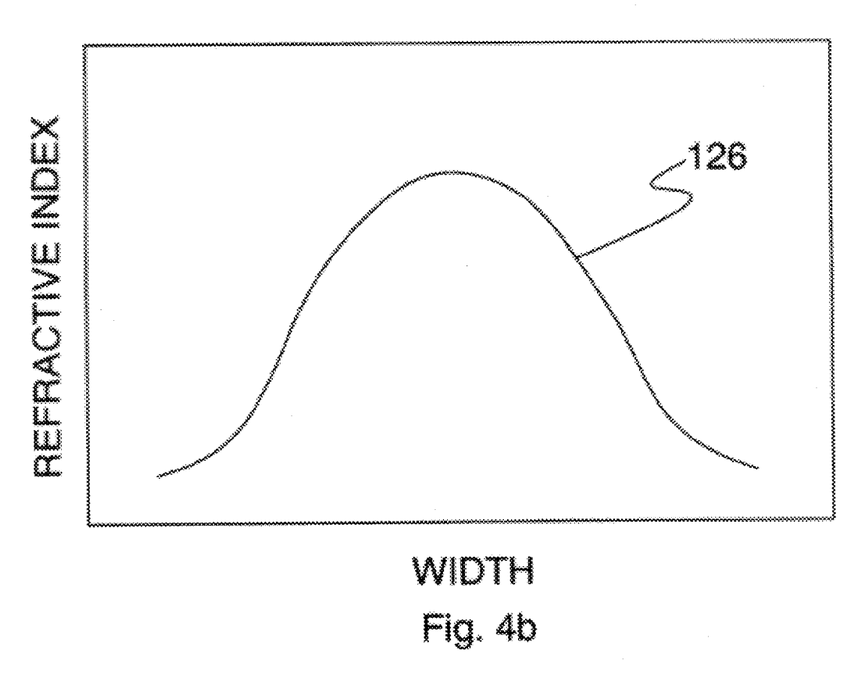
FIG. 4(b) is a graphical representation of the gradient index of the lens in FIG. 4(a).

The resultant profile of refractive index across the width of the block 120 is represented by curve 126 in FIG. 4(b). This curve 126 is, as may be expected, a combination of two of the curves 118 illustrated in FIG. 3(c). In order for the block 120 to act as a cylindrical GRIN lens that focuses light into a line such as line 148 in FIG. 2, the curve 126 of the refractive index profile must be substantially quadratic.

Figure 5A:
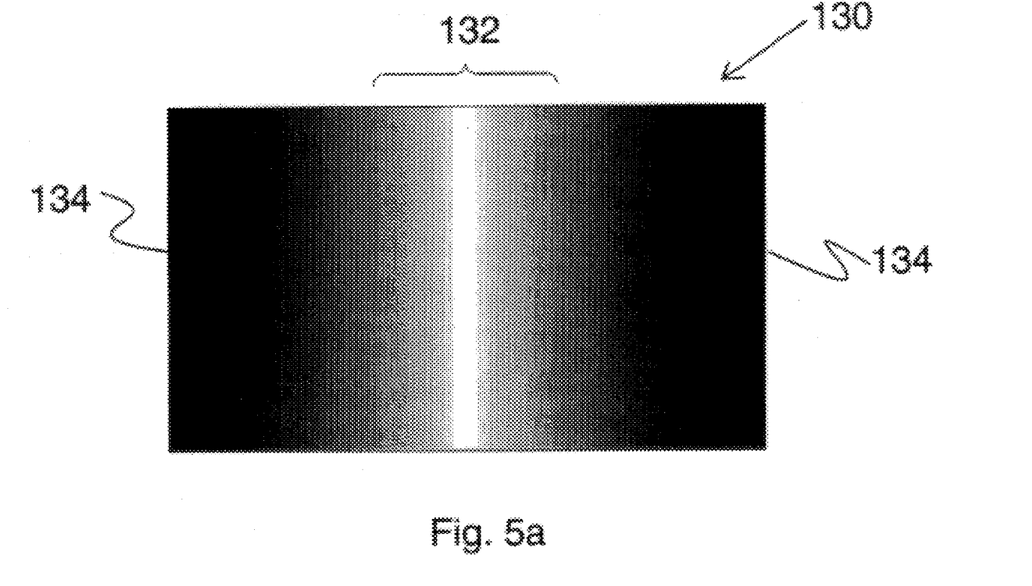
FIG. 5(a) represents another embodiment of a cylindrical GRIN lens.
Figure 5B:
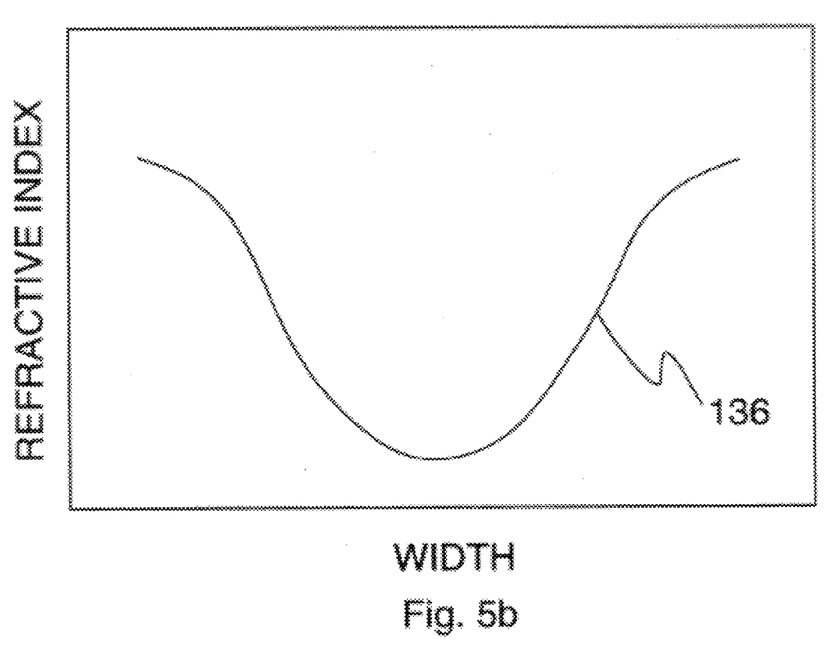
FIG. 5(b) is a graphical representation of the gradient index of the lens in FIG. 5(a).

If the low index faces 112 are joined, the resultant block or lens blank 130 of optical material is as schematically represented in FIG. 5(a). In this lens blank 130 the central zone 132 has the lowest refractive index, while the outer edges 134 have the highest refractive index. The profile of refractive index across the width of the block 130 is represented by curve 136 in FIG. 5(b) and, depending on the intended application, may also be quadratic.

Finally, the resultant lens blank 120 or 130 is sliced, ground and preferably polished, to produce a cylindrical GRIN lens.

Alternatively the lens blank may be formed from starting sheets of optical material of appropriate thicknesses and compositions in a single operation by stacking all of the layers together in the appropriate order (i.e with the sheet having the highest or lowest refractive index in the middle and the sheets having respectively the lowest or highest refractive index on the outside) and fusing and diffusing the stack together.

Selecting the Layers of Optical Material

The quadratic profiles of a cylindrical GRIN lens 140 (FIG. 2) can be respectively expressed as:

$$n(x)=n_o-Nx^2 \qquad (6)$$

where n(x) is the refractive index along a line 150 perpendicular to the axial plane defined by the abutting faces of cylindrical GRIN lens 140 (FIG. 2), $n_o$ is the refractive index at the center of the surface of the lens, N is the coefficient of the quadratic index profile for a given wavelength impinging on the lens, and x is the distance measured from the center of the surface of the lens. Along the front and back surfaces of lens 140, the portion closest to the center of the surface has the highest index of refraction, while portions farthest from the center of the surface have the lowest index of refraction.

By selecting certain properties of the materials used to form a cylindrical GRIN lens having a quadratic profile of refractive index, it is possible to obtain desired dispersion characteristics. One frequently desired dispersion characteristic is a spectrally invariant GRIN lens. When the thickness of a cylindrical GRIN lens with a parabolic profile is significantly smaller than the focal length, the focal length, f, can be defined as:

$$f=1/(2N*t) \qquad (7)$$

where N is the coefficient of the parabolic refractive index profile for a given wavelength and t is the thickness of the sample. As illustrated by Equation 7, the focal length of a thin radial or cylindrical lens with a parabolic profile is independent of the base refractive index, no, and is only a function of the coefficient of the parabolic gradient profile, N. The dispersion of the gradient lens is decided by the coefficient, N, as a function of wavelength. And when N is independent of wavelength, the focal length of the gradient lens will be also independent of wavelength. Thus, the lens is called a spectrally invariant GRIN lens.

Figure 6A:
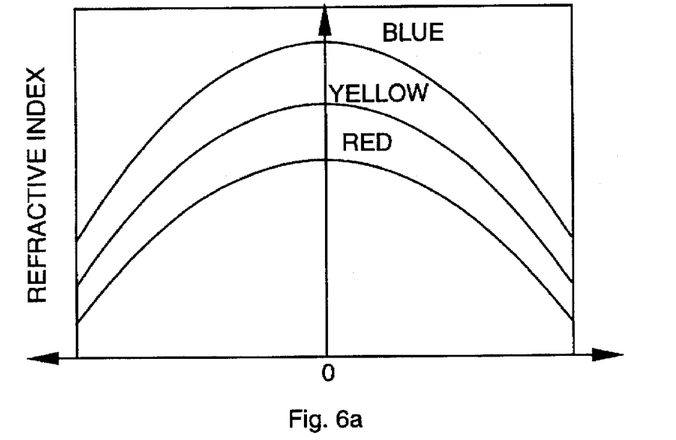
FIG. 6(a) is a graphical representation of the index profile of a quadratic gradient when $N_F > N_C$.
Figure 6B:
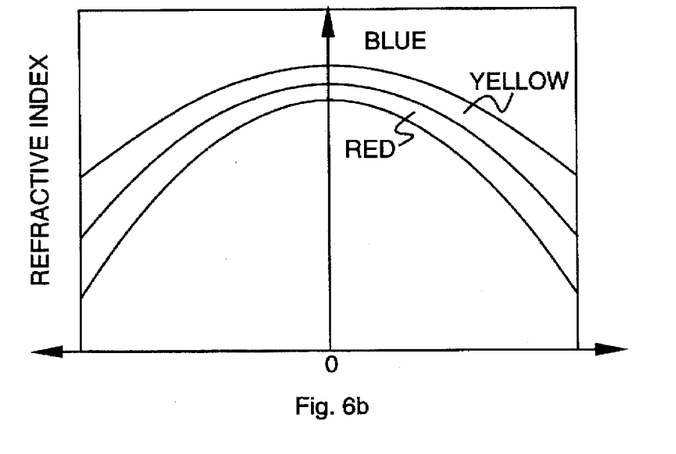
FIG. 6(b) is a graphical representation of the index profile of a quadratic gradient when $N_F < N_C$.

The dispersion of an optical gradient lens with a parabolic or hyperbolic profile of refractive index can be defined as:

$$V_{grin} = \frac{N_d}{N_F - N_C} \qquad (8)$$

where $N_d$, $N_F$ and $N_C$ are the coefficients of the quadratic refractive index profile for yellow, blue and red light, having wavelengths of 587.6, 486.1 and 656.3 nm, respectively. FIG. 6(a) illustrates the index profile when $N_F > N_C$ and $V_{grin} > 0$, i.e., the gradient has a positive dispersion. FIG. 6(b) illustrates the situation when $N_F < N_C$ and $V_{grin} < 0$, i.e., the gradient has a negative dispersion so that the resultant lens bends red light more than green light.

Figure 6C:
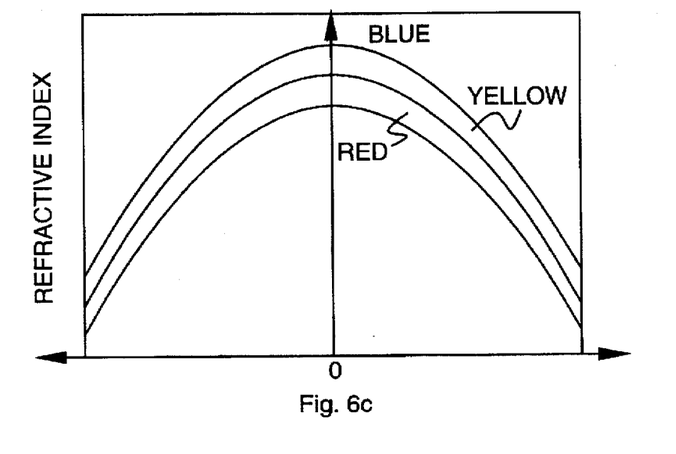
FIG. 6(c) is a graphical representation of the index profile of a quadratic gradient when $N_F = N_C$.

Finally, FIG. 6(c) illustrates the situation where $N_F = N_C$, and $V_{grin} \to \infty$, so that the optical dispersion of the gradient is independent of wavelength. Thus FIG. 6(c) illustrates an index profile for a spectrally invariant lens.

The mathematical approximation set out below defines the relation between the dispersion $V_{grin}$ of a cylindrical GRIN lens and the dispersion and indices of its component glasses on the high and low index and dispersion portions, assuming that the glasses between the two ends have intermediate indices and dispersion and Equation 3 is satisfied for each pair adjacent layers:

$$V_{grin} = \frac{\Delta n \, v_{dh} \, v_{dl}}{(v_{dl}(n_{dh}-1) - v_{dh}(n_{dl}-1))} \qquad (9)$$

where $\Delta n$ is the difference of refractive index of materials with the highest and lowest refractive indices for yellow light with wavelength of 587.6 nm, and $n_{dh}$, $v_{dh}$, $n_{dl}$ and $v_{dl}$ are the indices and Abbe numbers of those materials with highest and lowest refractive index for yellow light. In such a case, a lens with a number of layers q, and a desired Abbe number $V_{grin} = K$ can be obtained by selecting materials and other process parameters such that Equation 3 is satisfied for each two layers in the lens.

The Abbe number $V_{grin}$ can be any desired positive or negative number and, as explained above, can approach infinity if the denominator of Equation 3 approaches zero for each two layers in the lens, in which case Equation 5 will be satisfied for the lens as a whole. In such case the resultant GRIN lens becomes spectrally invariant with little or no chromatic aberration.

The relationship defined by Equations 4 and 5 for a spectrally invariant GRIN lens applies not only to gradient lenses having a quadratic refractive index profile, but also to other gradient optical elements with other profiles of refractive index. This can be shown by first substituting Equation 1:

$$v_d = \frac{n_d - 1}{n_F - n_C} \qquad (1)$$

back into Equation 5, to derive:

$$n_{Fh} - n_{Fl} = n_{Ch} - n_{Cl} \qquad (10)$$

where $n_{Fh}$ and $n_{Fl}$ are the highest and lowest refractive index for blue light, and $n_{Ch}$ and $n_{Cl}$ are the highest and lowest refractive index for red light in the group of optical materials constituting a spectrally invariant gradient lens having a parabolic or hyperbolic profile.

When a ray of light enters a gradient lens in the direction perpendicular to the direction of the gradient, light bends toward the higher index region(s). When the thickness of the lens is small, the exit angle $\alpha$ for any gradient lens having a desired refractive index profile, is proportional to the first derivative, dn/dz, of the refractive index profile, n(z), and the thickness along the optical axis t:

$$\alpha = \frac{dn}{dz} * t \qquad (11)$$

For a blue light (F) and a red light (C), the spectrally invariant condition $\alpha_F = \alpha_C$ is:

$$\frac{dn_F}{dz} = \frac{dn_C}{dz} \qquad (12a)$$

which results:

$$dn_F = dn_C \qquad (12b)$$

and therefore, for any given profile of index of refraction, in order to achieve a spectrally invariant condition, the profile for $n_F$ must be parallel to that of $n_C$ and:

$$n_{Fh} = n_{Ch} + c \qquad (13a)$$

$$n_{Fl} = n_{Cl} + c \qquad (13b)$$

where c is a constant, and $$n_{Fh} - n_{Fl} = n_{Ch} - n_{Cl} \qquad (13c)$$

which is the same relationship as defined in Equation 10 for a spectrally invariant GRIN lens having a parabolic or hyperbolic profile. A spectrally invariant GRIN optical device with any desired profile of refractive index can be obtained by selecting the appropriate optical materials such that for each two layers:

$$n_{Fm} - n_{F(m-1)} = n_{Cm} - n_{C(m-1)} \qquad (13d)$$

where $n_{Fm}$ and $n_{Cm}$ are refractive indices for blue and red light at layer m and $n_{Fm-1}$ and $n_{C(m-1)}$ are refractive indices at layer m−1.

Using Equations 3 or 13(d), it is possible to choose a group of commercially available optical glasses based primarily on their index and dispersion properties as the base glasses to form substantially spectrally invariant gradient glass. For cylindrical GRIN optical elements, the intermediate layers preferably have initial refractive indices which approximate the refractive index values at their midpoints along a desired quadratic profile.

For example, Table 1, below, illustrates a group of six optical glasses suitable for creating a lens having a substantially spectrally invariant gradient. Once the desired glasses are selected based on their refractive index and dispersion properties, a quadratic profile can be formed by controlling the thickness of each layer.

TABLE 1

The refractive indices of a group of commercially available optical glasses for different wavelengths. $\Delta n$ is for LF7–LaK10.

| Glass  | $n_r$   | $n_o$   | $n_d$   | $n_e$   | $n_F$   | $n_g$   | $n_h$   |
|--------|---------|---------|---------|---------|---------|---------|---------|
| LF7    | 1.5686  | 1.5709  | 1.5750  | 1.5783  | 1.5856  | 1.5927  | 1.5995  |
| BaF4   | 1.5992  | 1.6015  | 1.6056  | 1.6089  | 1.6161  | 1.6232  | 1.6299  |
| BaF12  | 1.6327  | 1.6351  | 1.6393  | 1.6427  | 1.6501  | 1.6573  | 1.6642  |
| BaF10  | 1.6634  | 1.6658  | 1.6700  | 1.6734  | 1.6808  | 1.6880  | 1.6949  |
| LaF20  | 1.6759  | 1.6782  | 1.6825  | 1.6859  | 1.6932  | 1.7003  | 1.7070  |
| LaK10  | 1.7132  | 1.7157  | 1.7200  | 1.7234  | 1.7308  | 1.7378  | 1.7444  |
| $\Delta n$ | 0.1446  | 0.1448  | 0.1450  | 0.1451  | 0.1452  | 0.1451  | 0.1449  |

Using Equation 9, the Abbe number for a radial or cylindrical GRIN lens with a desired profile of refractive index based on materials selected according to Table 1 is approximately 360, which is far greater than the Abbe number of currently available homogeneous glasses. (Note that fluoride glasses have the highest Abbe number among all the known homogeneous glass systems, and the highest Abbe number for the fluoride glasses is still below 100.)

Equations 3–5 and 13 set forth the theoretical basis for selecting glasses with appropriate index and dispersion properties to produce a GRIN lens or other GRIN optical elements with desired dispersion characteristics, including a spectrally invariant gradient.

On the other hand, rather than selecting a group of glasses as described above, it is also possible to manufacture glasses with desired index and dispersion properties to satisfy Equations 3 and 13(d).

The index and dispersion of a glass is determined by its composition. For a lead silicate glass, its $Pb^{2+}$ ion is the most important component controlling the optical properties of the glass. The high polarizability of $Pb^{2+}$ makes it very effective for increasing both the, index of refraction and dispersion. On the other hand, ions such as $Ba^{2+}$, $La^{3+}$, $Nb^{5+}$, $Ta^{5+}$, and $Zr^{4+}$ ions can increase the index of refraction of a glass and still maintain a relatively small dispersion. Thus glasses with high index and high Abbe number can be made by adding $Ba^{2+}$, $La^{3+}$, $Nb^{5+}$, $Ta^{3+}$, $W^{6+}$, and $Zr^{4+}$ ions as their important components. Therefore, by varying the concentration of PbO, BaO, $La_2O_3$, $Nb_2O_5$, $Ta_2O_3$, $WO_3$ and $ZrO_2$, a glass with desired index and dispersion characteristics can be formulated.

The individual glass layers that are to be fused and diffused together should be chemically compatible, so that after diffusion no devitrification or phase separation results. The thermal expansion coefficients of the individual glass layers should also be matched with each other within about $3 \times 10^{-7} \ °C^{-1}$.

One method of selecting the glass components, thicknesses and diffusion regions for a multilayer lens element to achieve a desired refractive index profile is disclosed in the U.S. Pat. No. 5,262,896, issued Nov. 16, 1993 to Blankenbecler, the disclosure of which is hereby incorporated by reference.

Figure 7:
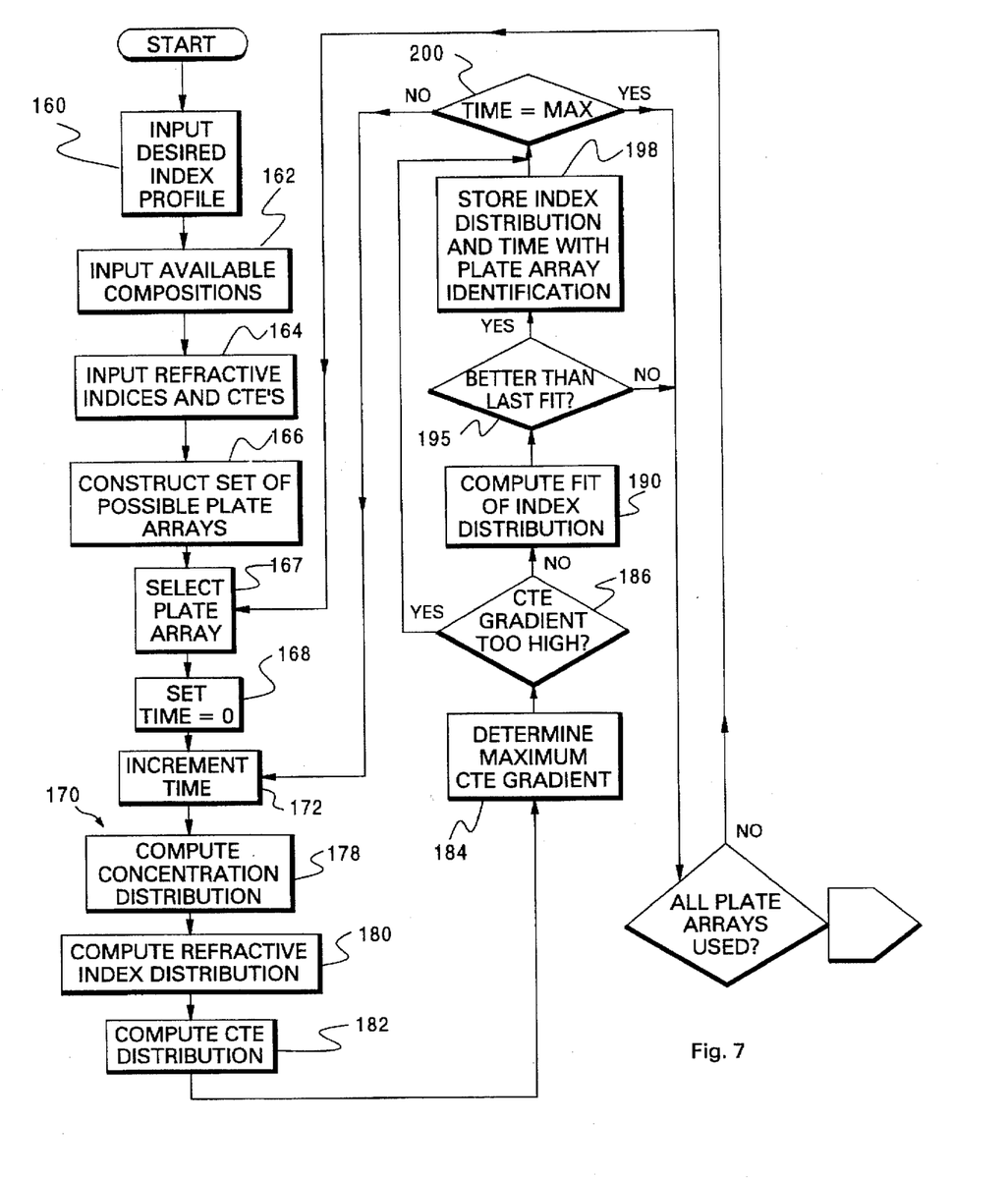
FIG. 7 illustrates the process for selecting an array of optical materials of an optical element having a desired profile of refractive index.

The flow chart of FIG. 7 describes the Blankenbecler process for determining an optimum plate array of optical materials to obtain a desired profile of refractive index after a fusion and diffusion process. The method is based on the principle that a starting array of optical materials with certain refractive indices can be selected for which the index of refraction curve achieved after a certain diffusion time matches the desired index of refraction profile within a desired tolerance.

Referring now to FIG. 7, the process for selecting an appropriate set of starting compositions and thicknesses for an array of optical materials and a selected diffusion time begins with step 160 in which the desired profile for the index of refraction is selected. The compositions of the optical materials available for use are determined in step 162. This represents actual concentrations of constituents in particular batches of optical materials which are available for use in the fabrication process. At step 164, properties, such as the diffusion constant at a particular diffusion temperature to be employed, the refractive index,. Abbe number, coefficient of thermal expansion, and density of each available optical material are determined.

At step 166, a set of starting spatial distributions of optical layers available for the diffusion process is prepared meeting the requirements of Equation 9 and certain other criteria, such as chemical compatibility and similar coefficients of thermal expansion. That is, if control of dispersion according to the present invention is desired, the set should have only plate arrays that can meet the condition set forth in Equation 9. The possible starting spatial distributions correspond to a finite number of possible layers which can be made using the available compositions.

Once the set of starting arrays of optical materials to be considered has been prepared, the arrays are examined in sequence. For each selected array, the diffusion time; is first initialized to zero at step 168. Thereafter, the process enters a repetitive logic loop 170. On each pass, the diffusion time is incremented and hence a new diffusion time is provided at step 172.

At step 178, the concentration distribution of different constituents of each optical material in the array—for the diffusion time provided at step 172—is calculated by using a differential equation corresponding to the diffusion process. The boundary condition for the differential equation is determined by the initial characteristics of the optical materials prior to diffusion. The concentration distribution is then calculated by applying the boundary condition in the solution of the diffusion equation:

$$\frac{d}{dz} \left[ D_i(c^i) \frac{d}{dz} c^i(z,t) \right] = \frac{d}{dt} c^i(z,t) \tag{14}$$

Where z is distance along the plate array, t is time, $c^i$ is the concentration of the $i^{th}$ constituent, and $D_i$ is the diffusion coefficient for the $i^{th}$ constituent.

Once the system has calculated the concentration distribution for a particular army of optical materials and a particular diffusion time, it proceeds to calculate the property distributions for that time, including computation of refractive index distribution at step 180, and coefficient of thermal expansion distribution at step 182.

The property distribution is calculated by using a concentration to property relationship, relating each property to the concentrations of the various constituents. Each such concentration to property relationship is in the form:

$$f(n(z))=f(n_o)+\Sigma_i(c^i(z)-c^i_o)F_i \qquad (15)$$

The Abbe number and coefficient of thermal expansion can also be calculated based on this concentration to property relationship, where f is a function, $F_i$ is a coefficient associated with the $i^{th}$ constituent, n(z) is a property n at location z along the gradient, $n_o$ is the property n of a reference material, $c^i(z)$ is the concentration of the $i^{th}$ constituent at location z and $c^i_o$ is the concentration of the $i^{th}$ constituent in the reference material. Most preferably, within a region of a stack of optical materials corresponding to a particular plate—prior to diffusion—that particular plate, or an adjacent plate is considered as the reference material.

When the property calculated is refractive index n, the function f may be the Lorentz—Lorenz formula wherein:

$$f(n) = \frac{3(n^2-1)}{n^2+2} \qquad (16)$$

That is, where n represents the refraction index, the Lorentz—Lorenz law of refractive index states that:

$$\frac{3(n^2-1)}{n^2+2} = \Sigma_i c^i(z) P_i \qquad (17)$$

In which $P_i$ is the electric polarizability of the $i^{th}$ constituent. Therefore, where n represents the refractive index and Equation 17 is used, each coefficient $F_i$ of Equation 15 represents the electric polarizability $P_i$ associated with the constituent.

The coefficient of thermal expansion can also be calculated based on the concentration to property relationship explained above.

The coefficient of thermal expansion distribution represents the values of coefficients of thermal expansion which the array of optical materials would have if diffusion were stopped at the particular time provided at step 172.

At steps 184 and 186, the coefficient of thermal expansion distribution is examined determine the maximum coefficient of thermal expansion ("CTE") gradient, i.e., the maximum value of the slope of the plot of coefficient of thermal expansion versus position along the array of optical materials. This maximum coefficient of thermal expansion value is checked against a preselected maximum, which corresponds to the maximum thermal stress the selected array of optical materials can be subjected before a breakdown.

If the maximum CTE gradient is less than the preselected maximum CTE gradient, then, for the array of optical materials selected at step 167 and subjected to diffusion for the selected diffusion time provided at step 172, the array yields a lens blank which can survive the fusion and diffusion process.

At step 190, a value of the fit is computed, between the computed refractive index profile and the desired refractive index profile. Most preferably, the fit is computed as the sum of the squares of deviation between the predicted refractive index distribution and the desired index distribution. At step 195, a determination is made whether the fit provided by the newly calculated refractive index distribution is better than any previously stored value of fit for the same plate array. If so, at step 198, the newly computed index profile is stored, together with the value of the time provided at step 172 and the particular array of optical materials selected at step 167. At step 200, if the time used on the last pass is less than the maximum allowable diffusion time, loop 170 is repeated again until the maximum allowable diffusion time is exhausted and the best fit is stored.

The process discussed above is repeated for all available arrays of optical materials that can be used and the array with the best fit is selected to form the actual physical sample with desired profile of index of refraction.

According to an alternative method of manufacturing a multilayer GRIN lens, the starting thickness of each layer is optimized to form a gradient with a desired profile.

The desired starting thicknesses of glass layers of a cylindrical GRIN lens can be obtained in accordance with an iterative process using a model based on the following equation:

$$n(x,t,D_i,T_i,n_i) = n_i + \frac{1}{2} \sum_{i=1}^{i=m} (n_{i+1}+n_i) \left[ 1 + \mathrm{erf}\,\frac{(x-T_i)}{2\sqrt{D_{i,i+1}t}} \right]$$

where
n=index of refraction at position x
$n_i$=index of refraction of each layer
x=position measured from one end of the lens
$T_i$=position measured from interface between i and i+1 layer to one end of the lens before diffusion
t=diffusion time
$D_{i,i+1}$=interfacial diffusion constant between adjacent i and i+1 layers
m=number of glass layers It is possible to derive the optimum starting thickness of each layer for achieving a given set of characteristics by first estimating the interfacial diffusion constants of an arbitrary GRIN block made of desired glass layers using an iterative process.

First, an arbitrary GRIN block sample made from the desired glass layers is formed by using a fusion and diffusion process at a given temperature. The sample does not necessarily have the desired profile and is only used to derive the interfacial diffusion constants between adjacent layers. As described in more detail below, Equation 18 is interactively applied to the sample until a set of estimated interfacial diffusion constants yield a set of data which best fits the actual profile of the sample.

Figure 8A:
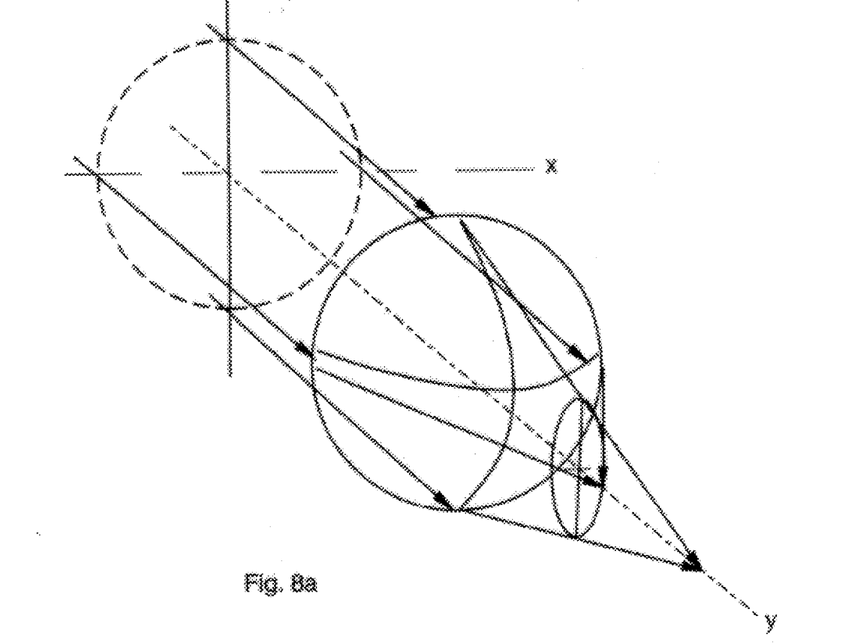
FIG. 8 illustrates refractive index curves generated according to another embodiment of the invention.
Figure 8B:
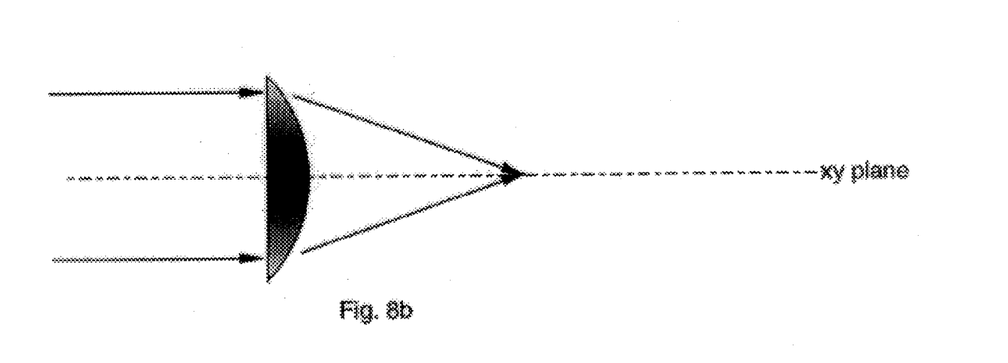
Figure 8C:
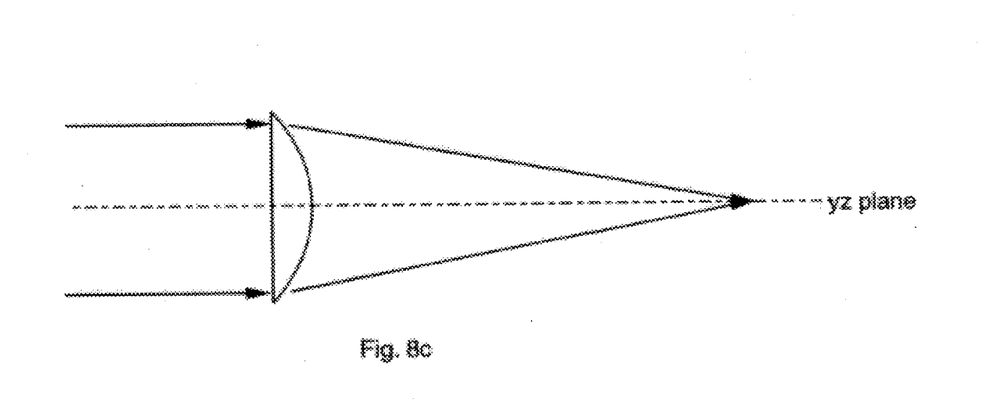

FIG. 8 illustrates a curve 210 generated from Equation 18 after few iterations, and a curve 220 obtained from measurements of the refractive index of the sample. The initial indices, thicknesses, diffusion times and diffusion temperatures used to make the sample are also used in Equation 18. The diffusion constants between the glass layers are the only values that are not known.

The diffusion constants between the glass layers of the sample can be obtained by iterative techniques. An arbitrary set of diffusion constants is used to generate a set of data representing a modeled refractive index profile, as illustrated by curve 210 in FIG. 8. Then, the square of the differences of the refractive indices at predetermined points between the two curves in FIG. 8 is calculated and the sum of the squares is derived. Next, a new set diffusion constants is used to obtain a new set of indices from Equation 18. The square of the differences of indices at each position between the new set and the actual data of the sample is derived again.

A simplex technique is used to estimate the values for the diffusion constants and to analyze how those estimates have altered the sum of the squares parameter. The process is repeated by making revised estimates of the diffusion constants based on past estimates until the sum of the squares is minimized and the model closely fits the data of the GRIN block sample. The set of diffusion constants yielding the best fit of the calculated curve 210 with the measured refractive index curve 220 are used as the actual diffusion constants of the sample.

Once the diffusion model fits the actual data of the sample, Equation 18, with the estimated diffusion constants, can be used to predict the effects of increasing or decreasing diffusion time and changing layer thicknesses on the index profile. Using an iteration technique similar to that described above for calculating the diffusion constants, the optimum thicknesses of the starting layers for fitting to a desired profile can be determined. Initially,, a first set of starting thicknesses is estimated and used in Equation 18 to derive a modeled profile of refractive indices. The modeled profile is compared to the desired profile, and the sum of the squares of the differences is calculated. The process is repeated until the modeled curve with the best estimated starting thicknesses that fits the desired profile is obtained. As a result, an actual GRIN lens can be made using the derived starting thicknesses. The temperature of the diffusion process during the manufacture of the desired GRIN lens is the same as the temperature of the diffusion process during the manufacture of the GRIN lens sample, which was initially used to determine the diffusion constants. An array of optical materials with layers having the derived starting thicknesses will have a refractive index profile after diffusion which substantially matches the desired profile.

The optimization technique described above can be used to yield a wide range of desired profiles from the same set of glasses.

Additional Application of Layered GRIN Material

Apart from using the flat faced blocks 120 (FIG. 4(a)) or 130 (FIG. 5(a)) of GRIN material as cylindrical lenses, it is possible to put a spherical or cylindrical surface on the material.

Figure 9A:
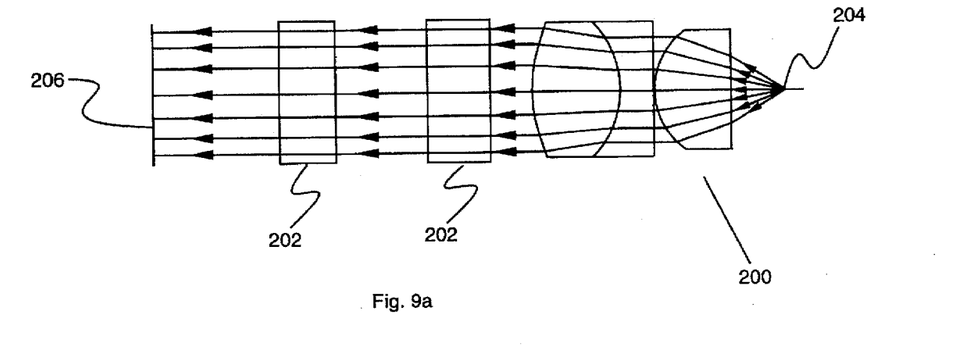
Figure 9B:
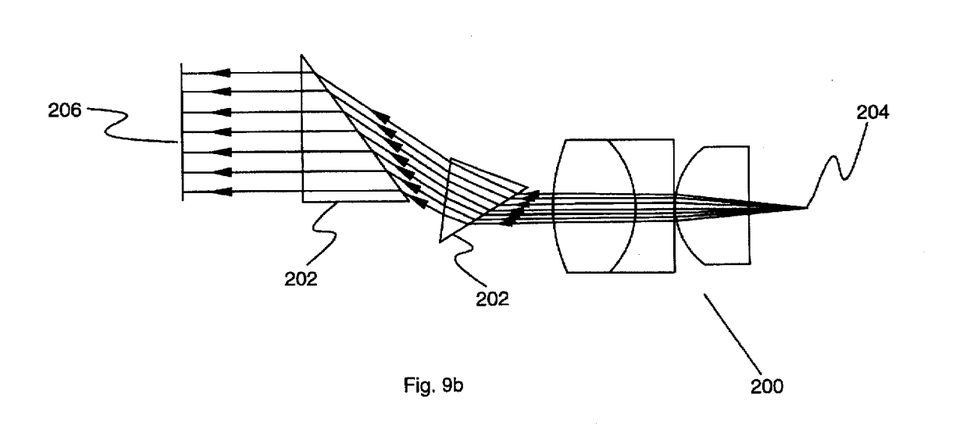

If, for example, a spherical surface is ground into the block 120 of GRIN material, the configuration as illustrated in FIG. 9(a) results. As is apparent from this FIG. and FIGS. 9(b) and (c), the resulting lens has a different focal length in respectively the xy- and xz-planes. This is because the spherical surface of the lens results in a focal length in both the xy- and xz-planes. In the xy-plane (FIG. 9(b)), however, the GRIN material of the lens provides additional focusing power which, as is illustrated in this embodiment, is cumulative to that provided by the spherical surface.

Thus, as illustrated in FIG. 9(a), the lens has two different focal lengths for these orthogonal planes. Alternatively put, the image of a circular shaped object will be distorted by the lens to the oval shape as illustrated.

One possible application for this configuration is to replace the conventional laser diode collimating lens system illustrated in FIGS. 10(a) and 10(b).

In these figures, a prior art laser diode objective lens system, generally indicated as 200 is shown to be constituted by a large number of lens elements and prisms 202 which together result in divergent beams of light emanating from a single source 204 being parallel to each other after they have passed through the lens system 200.

Importantly though, the beams of light emanating from source 204 are substantially more divergent in the xy-plane (FIG. 10(a)) than they are in the yz-plane (FIG. 10(b)). Once leaving the lens system 200 though, they are both parallel and would define an image on a screen 206 which has equal dimensions in both the xy- and yz-planes.

It is evident that the embodiment of the invention described with reference to FIG. 9(a) can be adapted to achieve the same result as the much more complicated prior art system described above with reference to FIGS. 10(a) and (b).

Although the present invention has been described above in terms of specific embodiments relating to optical material with a specific profile in refractive indices, it is anticipated that its principles can be applied to other forms of profiles of refractive indices. Other alterations and modifications of the process of the invention will no doubt become apparent to those skilled in the art. For example, it is anticipated that many uses for the novel cylindrical GRIN lens and the different GRIN lenses with specifically assigned dispersion characteristics will manifest themselves. It is therefore intended that the following claims be interpreted as covering all such other applications, alterations and modifications as fall within the true spirit and scope of this invention.

What is claimed is:

1. A substantially spectrally invariant gradient optical element formed of optical material having front and back faces and an optical axis, said optical material having a refractive index varying symmetrically about a central plane containing said optical axis, said refractive index being substantially constant in directions parallel to said central plane, said central plane passing from one of said front and back faces to the other of said faces, said element having an Abbe Number greater than 100.

2. The element of claim 1 wherein the outer portions of said optical material orthogonally most distant from said central plane have substantially the same refractive index, being either the highest or the lowest of the refractive indices of said optical material, the refractive index at said central plane being either the lowest or the highest of the refractive indices of the optical material, respectively.

3. The element of claim 2, wherein the optical material defines a continuous gradient of refractive index from the central plane to each of the outer portions, respectively.

4. The optical element according to claim 3 wherein the front or back faces are planar and generally orthogonal to the central plane.

5. The optical element according to claim 4, wherein the front and back faces are planar.

6. The optical element according to claim 4, wherein at least one of said front and back faces has a curved surface.

7. The optical element according to claim 4, wherein at least one of said front and back faces has a spherical surface.

8. The element of claim 3, wherein at least one portion of optical material has a desired refractive index and dispersion, the desired refractive index and dispersion being achieved by a combination of oxides from a group of oxides including PbO, BaO, $Y_2O_3$, $La_2O_3$, $Nb_2O_5$, $TiO_2$, $ZrO_2$, $WO_3$, $Ta_2O_3$.

9. The optical element according to claim 3, wherein the continuous gradient of refractive index approximately defines one of a parabolic and a hyperbolic profile.

* * * * *